(12) United States Patent
Hiroshi

(10) Patent No.: US 9,677,595 B2
(45) Date of Patent: Jun. 13, 2017

(54) DIRECTIONAL INDICATION STRUCTURE FOR THREADED BODY

(75) Inventor: Michiwaki Hiroshi, Tokyo (JP)

(73) Assignee: NEJILAW INC., Tokyo (JP)

( * ) Notice: Subject to any disclaimer, the term of this patent is extended or adjusted under 35 U.S.C. 154(b) by 164 days.

(21) Appl. No.: 14/240,406

(22) PCT Filed: Aug. 19, 2012

(86) PCT No.: PCT/JP2012/070941
§ 371 (c)(1),
(2), (4) Date: May 25, 2014

(87) PCT Pub. No.: WO2013/027685
PCT Pub. Date: Feb. 28, 2013

(65) Prior Publication Data
US 2014/0308092 A1    Oct. 16, 2014

(51) Int. Cl.
*F16B 37/00* (2006.01)
*F16B 1/00* (2006.01)
*F16B 33/02* (2006.01)

(52) U.S. Cl.
CPC ............ *F16B 37/00* (2013.01); *F16B 1/0071* (2013.01); *F16B 2033/025* (2013.01)

(58) Field of Classification Search
CPC  F16B 41/005; F16B 23/0007; F16B 23/0076; F16B 37/00
(Continued)

(56) References Cited

U.S. PATENT DOCUMENTS 2,136,523 A * 11/1938 Rosenberg ................. 411/500
3,656,396 A *  4/1972 Gutshall .................... 411/403
(Continued)

FOREIGN PATENT DOCUMENTS

| JP | 2009-539046 A | 11/2009 |
| KR | 10-2006-0012132 A | 7/2006 |
| WO | 2007/141717 A1 | 12/2007 |

OTHER PUBLICATIONS

The Office Action issued by the Chinese Patent Office on Mar. 19, 2015 for the corresponding CN Patent Application No. 201280041309.4.
(Continued)

*Primary Examiner* — Flemming Saether
(74) *Attorney, Agent, or Firm* — Kilpatrick Townsend & Stockton LLP

(57) ABSTRACT

[Problem] The present invention aims to provide, without an increase in cost, a directional indication structure for threaded bodies that enables the visual and tactile distinction between left-hand thread and right-hand thread threaded bodies, enables the identification, from the external appearance and the external surface, of which direction a threaded body should be rotated in order to be tightened or loosened, enables mass production and the like, has a good external appearance, and has form properties that do not impinge the properties inherent in the threaded body or the strength, etc. thereof.

[Solution] Directional indicators are asymmetrically provided, in association with the direction of rotation of the threads, to the outer surface of a solid body constituting a threaded body, said directional indicators having corner portions which indicate the forward direction in the direction of rotation, and corner portions which indicate the direction in which the threaded body will advance when rotated in the forward direction in the direction of rotation.

6 Claims, 2 Drawing Sheets

(58) Field of Classification Search
USPC ....... 411/910, 911, 427, 402, 435, 409, 408, 411/14, 187
See application file for complete search history.

(56) References Cited

U.S. PATENT DOCUMENTS

| | | |
|---|---|---|
| 6,616,391 B1 | 9/2003 | Druschel |
| 7,568,874 B2 * | 8/2009 | Riedel et al. ................. 411/435 |
| 7,802,954 B2 * | 9/2010 | Albach et al. ................ 411/408 |
| 2004/0067120 A1 * | 4/2004 | Speer ............................. 411/14 |

OTHER PUBLICATIONS

International Search Report and Written Opinion for PCT/JP2012/070941.

* cited by examiner (A)

(B)

(C)

DIRECTIONAL INDICATION STRUCTURE FOR THREADED BODY

CROSS-REFERENCE

The present application is a US National Stage of International Application No. PCT/JP2012/070941, filed 19 Aug. 2012, designating the United States, and claiming priority to Japanese Patent Application No. 2011-182279, filed with the Japanese Patent Office on Aug. 24, 2011 and entitled "DIRECTIONAL INDICATION STRUCTURE FOR THREADED BODY", which is hereby incorporated by reference in its entirety.

TECHNICAL FIELD

The present invention relates to a directional indication structure for a threaded body that may enable visual and tactile recognition of a rotation direction and a proceeding direction of a screw for a threaded body, for example, an externally-threaded body, particularly a bolt, and an internally-threaded body, particularly a nut.

BACKGROUND ART

In related arts, a screw may include a right-handed screw and a left-handed screw. The right-handed screw may include a thread groove or a thread in a form of a right-handed helix, and the left-handed screw may include a thread groove or a thread in a form of a left-handed helix. A screw formed on a periphery surface of a cylindrical hole in a solid member provided in, for example, a hexagonal prism, is referred to as an internally-threaded screw or a nut. A threaded body including a screw formed on an outer peripheral surface of a cylindrical member is referred to as an externally-threaded screw or a bolt. The externally-threaded screw and the internally-threaded screw may be screwed together for use.

An internally-threaded body with a right-handed screw may be paired with an externally-threaded body with a right-handed screw for use, and an internally-threaded body with a left-handed screw may be paired with an externally-threaded body with a left-handed screw for use. However, it is impossible to screw the externally-threaded body with the right-handed screw with the internally-threaded body with the left-handed screw. Conversely, it is impossible to screw the externally-threaded body with the left-handed screw with the internally-threaded body with the right-handed screw.

Accordingly, there is a desire for technology that may distinguish between a right-handed screw and a left-handed screw in an internally-threaded body to suitably screw an externally-threaded body with a left-handed screw or a right-handed screw paired therewith. The reverse may also be applied to the externally-threaded body. However, in related arts, a threaded body, particularly an internally-threaded body or a nut may include a thread portion on an inner peripheral surface thereof. Thus, there may be no difference in terms of an external appearance or an outer surface, and it may be impossible to rationally distinguish between a right-handed screw and a left-handed screw based on an external appearance or an outer surface of the internally-threaded body.

PRIOR ART DOCUMENTS

Patent Documents

Reference 1: Japanese Patent Laid-Open Publication No. 2005-061442

Reference 2: Japanese Patent Laid-Open Publication No. 2001-056009

DISCLOSURE OF INVENTION

Technical Goals

An aspect of the present invention provides, to solve the issue described above, a directional indication structure for a threaded body that may enable visual and tactile distinction between a threaded body with a left-handed screw and a threaded body with a right-handed screw. The structure may enable distinction between a nut with a left-handed screw and a nut with a right-handed screw from external appearances and outer surfaces thereof by applying, to the threaded body, a rotation direction indication that indicates a rotation direction of the left-handed screw or the right-handed screw and a proceeding direction indication that indicates a proceeding direction with respect to the rotation direction. The structure may be easily manufactured and mass-produced without increasing costs. The structure may have an aesthetic external appearance and an excellent shaping property that may not impinge on the inherent properties or durability of the threaded body.

Technical Solutions

According to an aspect of the present invention, there is provided a directional indication structure for a threaded body, the structure including a threaded body including a solid body, and a thread portion provided on a portion of the solid body. At least one asymmetric direction indicator may be provided on an outer surface, other than the thread portion of the threaded body, around an axis of rotation with respect to a forward rotation direction and a reverse rotation direction of the thread portion.

The direction indicator may include at least one facet.

The facet may be provided in a form of a substantially flat surface or a substantially curved surface.

The facet may be provided in a form of an asymmetric substantial triangle.

The facet may form an asymmetric substantial triangle. The asymmetric triangle may include a first corner disposed in the forward rotation direction of the thread portion, a second corner disposed in the reverse rotation direction of the thread portion, and a third corner disposed in a proceeding direction of the axis of rotation. A distance between the first corner and the third corner may be set to be longer than a distance between the second corner and the third corner.

The direction indicator may be provided on an outer surface of a head portion of an externally-threaded body or an outer surface of an internally-threaded body that is provided in a shape of a substantially polygonal prism constituting the solid body.

The direction indicator may be provided at an apex portion of a portion provided in a shape of a substantially polygonal prism constituting the solid body.

The direction indicator may be provided at both a top apex portion and a bottom apex portion when an axial direction of the thread portion is set to be parallel to a vertical direction.

The direction indicator may be provided at a location of at least one of angled portions of a polygon substantially having an even number of faces when viewed from a top view of the solid body forming a shape of a polygonal prism substantially having an even number of faces.

The direction indicator may be set as an asymmetric substantial triangle in an apex portion including a first ridge line extending in the forward rotation direction to be parallel to a substantially horizontal direction, a second ridge line extending in the reverse rotation direction to be parallel to the substantially horizontal direction, and a third ridge line extending in a proceeding direction to be parallel to the axis of rotation. The asymmetric substantial triangle may include a first corner disposed in the forward rotation direction of the thread portion on the first ridge line, a second corner disposed in the reverse rotation direction of the thread portion on the second ridge line, and a third corner disposed in a proceeding direction of the axis on the third ridge line. The distance between the first corner and the third corner may be set to be longer than a distance between the second corner and the third corner.

Advantageous Effects

According to embodiments of the present invention, it is possible to provide a directional indication structure for a threaded body. By providing, on an outer surface of a solid body constituting the threaded body, a direction indicator that is set to be asymmetric with respect to a rotation direction of a screw, and includes a corner to indicate a forward rotation direction, and a corner to indicate a proceeding direction of the threaded body when a thread portion is rotated in the forward rotation direction, the structure may simultaneously enable visual and tactile distinction between a threaded body with a left-handed screw and a threaded body with a right-handed screw, and enable identification, from an external appearance and an outer surface, of a direction in which the threaded body is to be rotated to tighten or loosen the threaded body. The structure may be easily manufactured and mass-produced without increasing costs. The structure may have an aesthetic external appearance and an excellent shaping property that may not impinge on the inherent properties or durability of the threaded body.

BEST MODE FOR CARRYING OUT THE INVENTION

Figure 1:
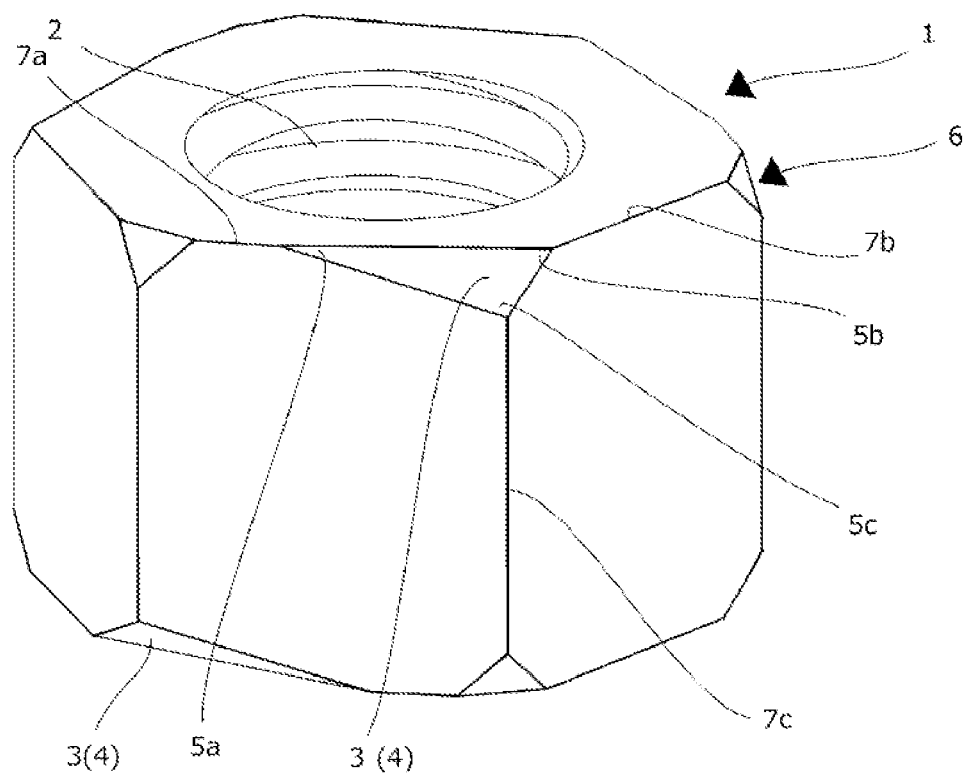
FIG. 1 is a perspective view of an internally-threaded body with a right-handed screw according to an embodiment of the present invention.
Figure 2:
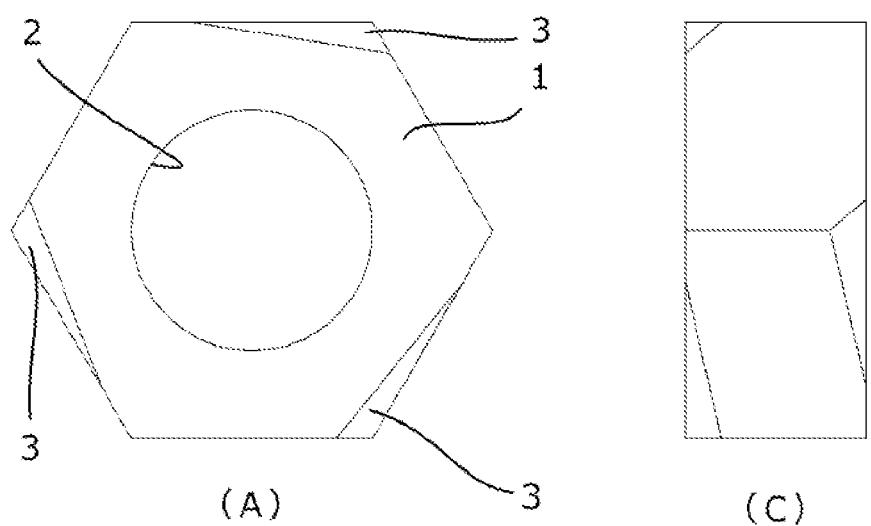
FIG. 2A is a top view of an internally-threaded body with a left-handed screw when viewed from an axial direction according to an embodiment of the present invention.
FIG. 2B is a front view thereof.
FIG. 2C is a side view thereof.
Figure 2:
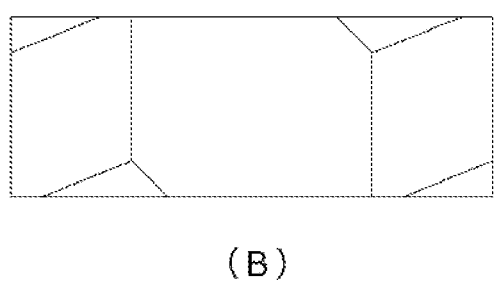

Hereinafter, embodiments of the present invention will be described in detail with reference to the accompanying drawings (FIGS. 1 and 2). According to embodiments of the present invention, there is provided a directional indication structure for a threaded body that may simultaneously enable visual distinction based on an external appearance, from all directions, and tactile distinction, from an outer surface, between a right-handed screw based threaded body and a left-handed screw based threaded body, and enable identification, from the external appearance and the outer surface, of a direction in which the threaded body is to be rotated to tighten or loosen the threaded body. The structure may be easily manufactured and mass-produced without increasing costs. The structure may have an aesthetic external appearance and an excellent shaping property that may not impinge on the inherent properties or durability of the threaded body.

The present invention may be applied to an outer surface of an internally-threaded body 1 that is represented by a nut, or an outer surface of a head portion of an externally-threaded body that is represented by a bolt.

A threaded body, for example, the internally-threaded body 1 or the externally-threaded body, may include a solid body, and a thread portion 2 provided on a portion of the solid body. In a case of the internally-threaded body 1, the thread portion 2 may be threaded on an inner peripheral surface of a hole drilled inside the solid body. In a case of the externally-threaded body, a portion of the solid body may be an axial portion, another portion of the solid body may be a head portion, and the thread portion may be threaded in a suitable area on an outer peripheral surface of the axial portion.

At least one direction indicator 3 may be provided on an outer surface of the solid body. In the case of the internally-threaded body 1, the outer surface of the solid body refers to an outer surface, other than the thread portion, forming a shape of a block. In the case of the externally-threaded body, the outer surface of the solid body refers to an outer surface of the head portion provided as a constituent component of the solid body. Such a three-dimensional shape of the solid body provided with the direction indicator 3 is not limited especially, but may be a shape of a polygonal prism, more particularly, a shape of a polygonal prism having an even number of faces, more preferably, a shape of a tetragonal prism or a hexagonal prism so that it may be applicable for general-purpose products in which a so-called hexagonal bolt or hexagonal nut is widely used.

The direction indicator 3 may include heterogeneous materials. However, the direction indicator 3 may include the same material constituting the solid body. Preferably, by configuring the solid body in a form including a desired direction indicator 3, a shaping property may increase while reducing manufacturing costs.

The direction indicator 3 may be set in an asymmetric form around an axis of rotation with respect to a forward rotation direction and a reverse rotation direction of the thread portion 2 provided in the threaded body. Preferably, the direction indicator 3 may be set to be asymmetric with respect to a rotation direction of the thread portion 2, and may include a corner to indicate the forward rotation direction, and a corner to indicate a proceeding direction of the threaded body when the thread portion 2 is rotated in the forward rotation direction. In FIGS. 1 and 2, the thread portion may be provided with a right-handed screw.

Each direction indicator 3 may include at least one facet. A single direction indicator may also be configured by providing at least two adjacent facets. However, it may be difficult to provide a direction indicator including a plurality of facets on a surface of a small-sized threaded body. In addition, it may be rather difficult to make distinction, and may lead to an increase in costs. Thus, preferably, a single direction indicator 3 may be provided with a single facet.

A facet 4 may be provided, preferably, in a form of a substantially flat surface or a substantially curved surface. However, the facet 4 may also be provided in an uneven form, a convex form, or a concave form, or may be provided with minute asperity.

The facet 4 may be provided in a form of an asymmetric substantial triangle. The substantial triangle may include an acute-angled corner, an obtuse-angled corner, and a round corner. Although such a corner may not necessarily be sharp, the substantial triangle may need to be provided in a geometric form that is asymmetric in terms of an external appearance and indicates a predetermined direction. The asymmetric substantial triangle constituting the facet 4 may include a first corner 5a disposed in the forward rotation direction of the thread portion, a second corner 5b disposed in the reverse rotation direction of the thread portion, and a third corner 5c disposed in a proceeding direction of the axis of rotation. By setting a distance between the first corner 5a and the third corner 5c to be longer than a distance between the second corner 5b and the third corner 5c, an asymmetric property and a direction indicating property may be implemented.

The direction indicator 3 may be provided, preferably, at an apex portion 6 of a portion provided in a shape of a substantially polygonal prism constituting the solid body. The apex portion 6 refers to an intersection point between a plane or a ridge line portion parallel to the axial direction of the thread portion and an angled portion formed with a plane perpendicular to an axis of an end portion in the axial direction, more preferably, an angled portion on a plane perpendicular to the axis, for example, an angled portion provided in a shape of a substantial polygon viewed from the axial direction. The apex portion 6 or the intersection point may indicate a substantial portion of the solid body, or may indicate a point in a space cut off by chamfering.

The direction indicator 3 may be provided at one of a top apex portion 6 and a bottom apex portion 6, or may be provided at both the top apex portion 6 and the bottom apex portion 6 when the axial direction of the thread portion is set to be parallel to a vertical direction.

The direction indicator 3 may be provided at a location of at least one of angled portions of a polygon substantially having an even number of faces when viewed from a top view of the solid body forming a shape of a polygonal prism substantially having an even number of faces. The direction indicator 3 may be provided at every apex portion 6. In this example, an appearance with an excellent rotational symmetry and an excellent design may be implemented. However, it may be significantly difficult to provide the direction indicating property, which is one of the original goals, due to the effect of the outstanding design.

In a preferable embodiment of the direction indicator 3, the apex portion 6 may be provided with a first ridge line 7a extending in the forward rotation direction to be parallel to a substantially horizontal direction, a second ridge line 7b extending in the reverse rotation direction to be parallel to the substantially horizontal direction, and a third ridge line 7c extending in a proceeding direction to be parallel to the axis of rotation, for example, as shown in FIG. 1. In a case in which the direction indicator 3 is set at the apex portion 6 as an asymmetric substantial triangle with respect to the rotation direction, the asymmetric substantial triangle may include a first corner 5a disposed in the forward rotation direction of the thread portion 2 on the first ridge line 7a, a second corner 5b disposed in the reverse rotation direction of the thread portion 2 on the second ridge line 7b, and a third corner 5c disposed in a proceeding direction of the axis of rotation on the third ridge line 7c. A distance between the first corner 5a and the third corner 5c may be set to be longer than a distance between the second corner 5b and the third corner 5c.

In so doing, the facet 4 provided in a form of an asymmetric substantial triangle may be set as the direction indicator 3 at a desired apex portion 6 on the outer surface of the solid body constituting the threaded body. The direction indicator 3 may be provided in a form of a substantial triangle having a corner on each ridge line at the apex portion 6 provided with the first ridge line 7a, the second ridge line 7b, and the third ridge line 7c of the solid body forming a shape of a polygonal prism, and correspond to a substantial triangle that is long and thin and expands in the rotation direction. Thus, the rotation direction may be indicated by a setting location and a direction of the first corner 5a. In addition, the proceeding direction when the threaded body is rotated in the forward rotation direction may be indicated by a setting location and a direction of the third corner 5c. Furthermore, since the direction indicator 3 is set at the apex portion 6, an effect similar to chamfering may be provided.

Although a few embodiments of the present invention have been shown and described on the directional indication structure for the threaded body, the present invention is not limited to the described embodiments. Instead, various modifications and variation can be made to these example embodiments without departing from the spirit or scope of the invention.

EXPLANATION OF SYMBOLS

1 Internally-threaded body
2 Thread portion
3 Direction indicator
4 Facet
5a First corner
5b Second corner
5c Third corner
6 Apex portion
7a First ridge line
7b Second ridge line
7c Third ridge line

The invention claimed is:

1. A threaded body structure with a direction indicator, the structure comprising:
a solid body, the solid body having a top portion located at a first extremity, a bottom portion located at a second extremity, a first ridge line extending in a forward rotation direction perpendicular to an axis of rotation, a second ridge line extending in a reverse rotation direction perpendicular to the axis of rotation, and a third ridge line extending in a direction parallel to the axis of rotation;
a thread portion provided on a portion of the solid body and;
at least one asymmetric direction indicator provided on an outer surface at the top portion of the solid body which is visible from both a top view and a front view; the asymmetric direction indicator comprising an asymmetric triangle with respect to the rotation direction, the asymmetric triangle includes a first corner disposed in the forward rotation direction on the first ridge line, a second corner disposed in the reverse rotation direction on the second ridge line, and a third corner disposed in a proceeding direction of the axis of rotation on the third ridge line; a distance between the first corner and the third corner is longer than a distance between the second corner and the third corner.

2. The structure of claim 1, wherein the at least one asymmetric direction indicator comprises at least one facet.

3. The structure of claim 2, wherein the facet is provided in a form of a substantially flat surface.

4. The structure of claim 1, wherein the thread portion is provided on the interior of the solid body.

5. The structure of claim 4, wherein the solid body is provided in a shape of a substantially polygonal prism.

6. The structure of claim 1, further comprising:
at least one said asymmetric direction indicator is provided on an outer surface at the bottom portion of the solid body where an apex of the bottom portion of the solid body.

* * * * *